United States Patent [19]

Neefeldt

[11] 4,342,126
[45] Aug. 3, 1982

[54] WINDSHIELD WIPER BOOT

[76] Inventor: Edward F. Neefeldt, c/o Brown, 67-17 53rd Dr., Maspeth, N.Y. 11378

[21] Appl. No.: 212,266

[22] Filed: Dec. 2, 1980

[51] Int. Cl.$^3$ .............................. B60S 1/04; B60S 1/38
[52] U.S. Cl. ................................ 15/250.42; 15/250 R; 15/250.36; 15/257 R
[58] Field of Search ........... 15/250.07, 250.40, 250.41, 15/250.42, 250.36, 250 R, 246, 257 R

[56] References Cited

U.S. PATENT DOCUMENTS

| | | | |
|---|---|---|---|
| 2,469,791 | 5/1949 | Schneider | 15/250.07 |
| 2,790,194 | 4/1957 | Norine | 15/250.07 |
| 3,074,096 | 1/1963 | Van Hess | 15/250.07 |
| 3,199,563 | 8/1965 | Forrest | 15/246 X |
| 3,523,626 | 8/1970 | Racine et al. | 15/250.07 |

FOREIGN PATENT DOCUMENTS 1906670  8/1970  Fed. Rep. of Germany ... 15/250.07

*Primary Examiner*—Peter Feldman
*Attorney, Agent, or Firm*—Harvey B. Jacobson

[57] ABSTRACT

A windshield wiper boot constructed of molded rubber is designed to be fitted over and substantially cover a windshield wiper with the exception of the wiper blade. The boot serves the purpose of preventing the accumulation of snow, ice and other materials within the flexure portion of the windshield wiper so as to eliminate interference by these materials with the flexural movement of the wiper blade over a windshield.

3 Claims, 4 Drawing Figures

WINDSHIELD WIPER BOOT

BACKGROUND OF THE INVENTION

1. Field of the Invention

The present invention relates to windshield wipers such as used on motor vehicles and more particularly pertains to a protective boot which may be fittingly secured over a windshield wiper so as to prevent the accumulation of snow and other materials within the flexural portion of the wiper.

2. Description of the Prior Art

One of the more critical problems confronting developers of windshield wipers utilizable to clean windshields of motor vehicles has been how to keep the wiper blades at all times in a close, conforming relationship with the windshields being cleaned. In this respect, windshield wiper blades tend to wear out quickly, as well as to become embrittled with age. These wear and embrittlement problems usually result in the wiper blades losing their effectiveness. Specifically, the wiper blades lose much of their flexibility so that only portions of the blades make contact with a windshield during a wiping operation. This of course results in the blades losing their ability to clean the windshields and the driver of a vehicle is then faced with problems of streaking and dirt accumulation on his windshield which severely affect his visibility.

In an attempt to overcome these problems of wear and embrittlement, developers have designed a number of different types of windshield wipers, many of which use spring like flexural members attached to the wiper blades so that some of the wear and embrittlement may be offset through a biasing force provided by these flexural members. However, the use of these flexural members on wiper blades has created new problems, especially in climates where a lot of snow is experienced, since snow and other materials may accumulate about the flexural members and completely destroy their effectiveness. In this regard, accumulating snow often turns to ice which may cause the flexural members to temporarily warp out of shape thereby pulling portions of a wiper blade completely away from a windshield. Effectively then, the use of these flexurable members in snow climates has only presented new problems associated with attempts to keep wiper blades at all times in contact with windshields, while at the same time doing little to eliminate the problems of wear and embrittlement.

More or less accepting the problems of wear, embrittlement and material accumulation in the flexural portions of windshield wipers as being unsolvable, inventors have instead attemped to improve upon the construction of wiper blades per se so as to overcome these problems. In other words, the belief has been that the solution to these problems must lie in the development of better blades rather than in the structural configuration of the windshield wiper itself. However, the best attempts in improving wiper blade construction have been primarily directed towards the development of attachments designed to be positionable over the wiper blades completely covering the same and serving to effectively replace the wiping function thereof. For example, U.S. Pat. No. 2,141,023, issued to M. Ryan on Dec. 10, 1938, illustrates a sleeve constructed of an absorbent material and serving to completely cover a windshield wiper. The sleeve is designed to be soaked with antifreeze solution which is an effective means for melting and removing adhering particles of frozen moisture on a windshield. Effectively then, the Ryan sleeve serves as a substitute for a conventional wiper blade since the blade is no longer in contact with a windshield when the sleeve is in position. Similarly, U.S. Pat. No. 3,021,548, issued to B. Stoller on Feb. 20, 1962, illustrates another sleeve which completely covers a windshield wiper including its blade and which is designed to clean a windshield which is dry. As such, this sleeve is also used as a substitute for a wiper blade since the blade itself will no longer contact a windshield.

As can be appreciated, the use of these above described sleeve-like attachments has not been well accepted since the same are apparently not commercially available. In that the sleeves effectively act as no more than a substitute windshield wiper blade, the general movement of the industry has been towards the design of windshield wipers which have quickly removable, replaceable wiper blades. Basically then, the industry's solution to the problems of wear, embrittlement and material accumulation in the flexural members has been simply to frequently replace the wiper blades. However, through the use of the present invention, the problems associated with wear, embrittlement and material accumulation are substantially reduced.

SUMMARY OF THE INVENTION

The general purpose of the present invention, which will be described subsequently in greater detail, is to provide a windshield wiper cover or boot that eliminates many of the problems which interfere with the effectiveness of windshield wiper blades. To attain this, the present invention utilizes a molded rubber boot positionable over all of the structural components of a windshield wiper with the exception of the wiper blade so as to protect the flexural members attached to the blade from the outside environment. Essentially, the boot prevents snow and other material from accumulating around the flexural members thereby permitting a continual positioning of a wiper blade in a close conforming contact with a windshield. Additionally, the boot substantially protects the blade itself from the environment so as to reduce problems associated with wear and aging resulting in embrittlement.

It is therefore an object of the present invention to provide protection means for a windshield wiper.

It is another object of the present invention to provide a cover for a windshield wiper which is effective in preventing the accumulation of snow and other materials about the flexural portion of the windshield wiper.

It is a further object of the present invention to provide a cover for a windshield wiper which is effective in reducing the wear on the windshield wiper blade associated therewith.

Still another object of the present invention is to provide a cover for a windshield wiper which substantially reduces the aging and attendant embrittlement of a wiper blade associated therewith.

Yet another object of the present invention is to provide a cover for a windshield wiper which may be economically and easily manufactured.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
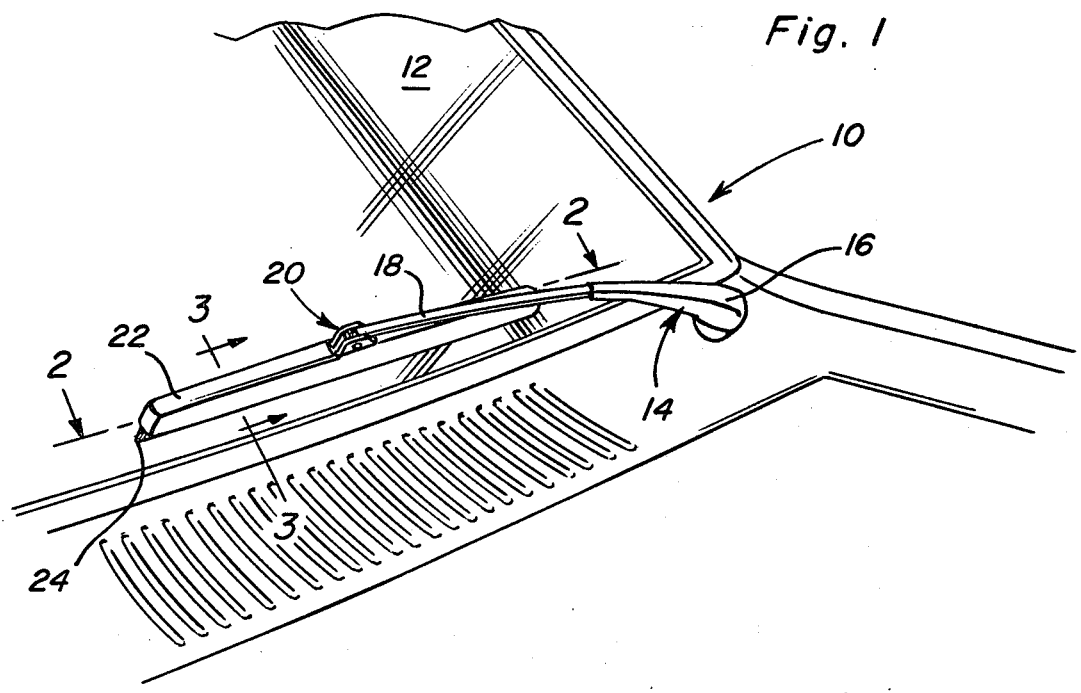
FIG. 1 is a perspective view of the windshield wiper boot forming the present invention fittingly secured over a windshield wiper operably attached to a motor vehicle.

Reference is now made to the drawings and, in particular, to FIG. 1 wherein there is illustrated in detail a motor vehicle 10 having a windshield 12 over which is slidably movable a windshield wiper 14. The wiper 14 includes a conventional activating member 16 having a blade arm 18 fixedly secured thereto, such blade arm then supporting a wiper blade retaining structure 20 replaceably removable therefrom. Also illustrated in FIG. 1 is a windshield wiper boot 22, which forms the structure of the present invention, and a wiper blade 24 extending therefrom and contacting the windshield 12.

Figure 2:
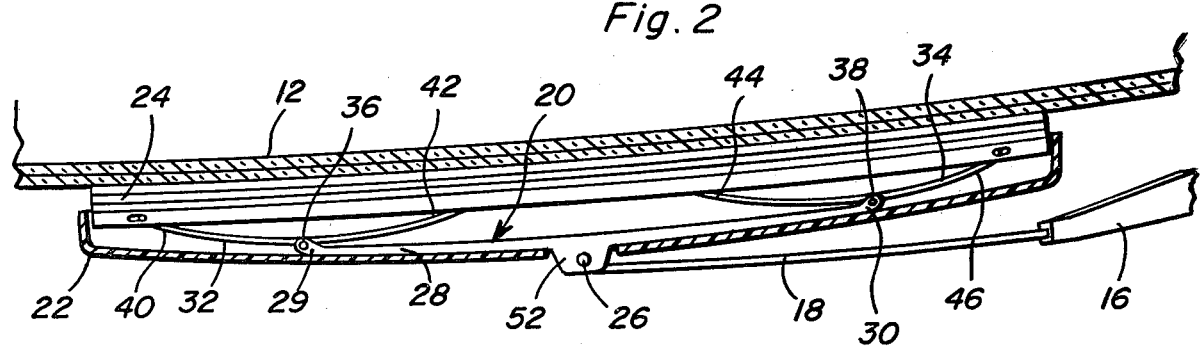
FIG. 2 is a longitudinal cross sectional view of the present invention taken along the line 2—2 of FIG. 1.

With reference to FIG. 2 of the drawings, it can be seen that the wiper blade retaining structure 20 is pivotally attached to the blade arm 18 at a connection point 26. In this respect, the connection point 26 serves both as a means for permitting the retaining structure 20 to conformingly move over a windshield 12 and as a means for removing the retaining structure from the blade arm 18 to thereby replace the same once a wiper blade 24 becomes worn and embrittled. The design of the connection point 26 is of a conventional construction which forms no part of the present invention and is therefore not illustrated in detail.

The wiper blade retaining structure 20 includes a first fairly rigid arm 28 which is centrally attached at the connection point 26 to the blade arm 18 and has a pair of distal ends 29, 30, which are each respectively pivotally attached to flexural spring members 32, 34. In this respect, the end 29 is pivotally attached at a connection point 36 to the flexural spring member 32 while the end 30 is pivotally attached at connection point 38 to the flexural spring member 34. As is apparent with reference to the drawing, the flexural spring member 32 is centrally pivotally attached to the end 29 and connection point 36 and has a pair of distal ends 40, 42, each of which are respectively attached to the wiper blade 24. Similarly, the flexural spring member 34 is centrally pivotally attached at the pivot connection point 38 to the end 30 and has a pair of distal ends 44, 46 attached to the wiper blade 24. Also clearly illustrated in FIG. 2 is the fact that the flexural spring members 32, 34 are of an arc-like shape which effectively permits a resilient movement thereof in response to a changing shape of the windshield 12, while at the same time a biasing force is provided by the flexural spring members against the wiper blade 24 to effectively hold the same in a close conforming contact with the surface of the windshield. Of course, this described structural configuration of the windshield wiper 14 is conventional in nature forming no part of the present invention and has been described solely to further amplify the aforementioned problems present in the prior art.

Figure 4:
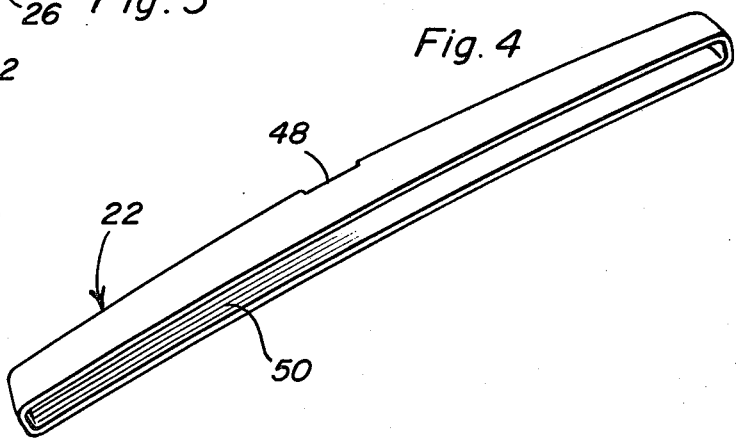
FIG. 4 is a perspective view of the boot forming the present invention as it appears when not fitted over a windshield wiper.

Turning now to the construction of the present invention, it can be seen that the windshield wiper cover or boot 22 is of a molded flexible construction which conforms with and fits over the wiper blade retaining structure 20. Referring to both FIG. 2 and 4 at the same time, it can be seen that the boot 22 is effectively a longitudinally-shaped sleeve having a pair of apertures 48, 50. In this respect, the aperture 48 is positioned on one side of the boot 22 and is just large enough to allow an extended portion 52 of the blade retaining structure 20 to protrude therethrough. Similarly, the aperture 50 is longitudinally shaped, extending substantially over the entire length of the boot 22, and serves to permit the entire length of the wiper blade 24 to extend therefrom so as to come into contact with a windshield 12.

Figure 3:
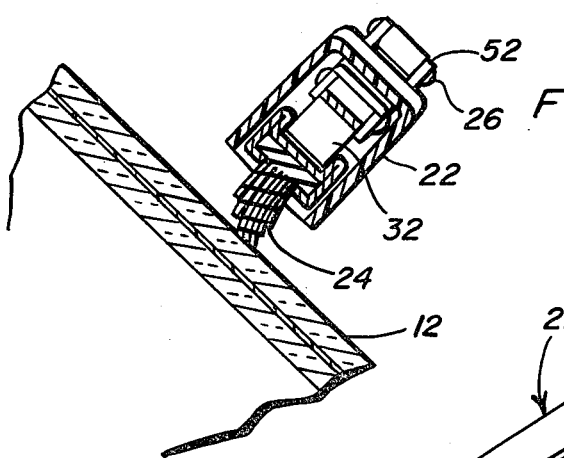
FIG. 3 is a transverse cross sectional view of the present invention taken along the line 3—3 of FIG. 1.

FIG. 3 further illustrates the boot 22 fitingly positioned over a windshield wiper 14 and is specific to the fact that the boot effectively covers the entire wiper blade retaining structure 20 other than the wiper blade 24. As can be appreciated then, most of the structural configuration of the windshield wiper 14, specifically the wiper blade retaining structure 20, is protected from the outside environment by the boot 22 thereby preventing the accumulation of snow and other materials around the flexural spring members 32, 34 which might otherwise limit their ability to flexurally conform to the shape of the windshield 12. Similarly, the boot 22 serves to prevent an overheating of the retaining structure 20 when exposed to sunshine thereby reducing somewhat the amount of embrittlement of the wiper blade 24 due to sun aging.

To use the present invention, it is envisioned that the windshield wiper boot 22 could be constructed of molded rubber in different shapes and sizes so as to be conformingly fittable over the various windshield wipers now in commercial use. Further, the wiper boot 22 is easily conformably fittable over a windshield wiper 14 simply by removing the wiper from the blade arm 18 in a conventional manner and then placing the boot over the wiper blade retaining structure 20. The windshield wiper 14 may then be reattached to the blade arm 18 at the connection point 26. Upon a discarding of the wiper blade retaining structure 20, the wiper boot 22 may be easily removed therefrom and repositioned over a replacement wiper blade retaining structure before attachment of the same to the blade arm 18. With respect to the above description, it should be realized that the optimum dimensional relationships for the parts of the invention are deemed readily apparent and obvious to one skilled in the art, and all equivalent relationships to those illustrated in the drawings and described in the specification are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A windshield wiper assembly protection means, said protection means comprising a cover being of only one piece of material and devoid of other components and being elongated along a longitudinal dimension having a section generally of an inverted curved shaped broad channel and the cover being foreshortened along a transverse dimension having a section generally of an inverted curved shaped narrow channel, said cover having at a domed portion thereof an aperture for communicating therethrough an extended portion of a blade retaining structure to just protrude and pass through in close proximity thereof while having distal therefrom a free edge forming a skirt and extending substantially around the entire length of the cover for sleeving over and directly contacting an entire windshield wiper assembly distal from a windshield wiper blade element so as to permit a length of the wiper blade to extend from the wiper blade itself so as to come into contact with a windshield, an interior surface of the cover along its longitudinal dimension conformably interfitting and engagingly contacting generally the entire length of a fairly rigid support arm of the windshield wiper assembly for the wiper blade element, said cover serving to effectively protect the structural components of said windshield wiper assembly from the outside environment while not interfering with a contact between a windshield surface and a windshield wiper blade forming a portion of said windshield wiper assembly.

2. The windshield wiper assembly protection means as defined in claim 1, wherein said cover is of a molded and resilient construction and is conformably fittingly positionable over a windshield wiper blade retaining structure forming a part of said windshield wiper assembly.

3. The windshield wiper assembly protection means as defined in claim 2, wherein said resilient construction is obtained through the forming of said cover out of a rubber material.

* * * * *